(12) United States Patent
Ott et al.

(10) Patent No.: US 6,227,717 B1
(45) Date of Patent: *May 8, 2001

(54) DUST CAPS FOR USE WITH TELECOMMUNICATIONS ADAPTERS AND CONNECTORS

(75) Inventors: Conrad L. Ott, Port Jefferson Station, NY (US); Edward J. Volansky, New Milford, CT (US)

(73) Assignee: The Siemon Company, Watertown, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,841

(22) Filed: Dec. 16, 1997

(51) Int. Cl.[7] .................................................. G02B 6/36

(52) U.S. Cl. .......................... 385/53; 385/134; 385/139

(58) Field of Search .............................. 385/53, 134, 135, 385/136, 139, 147; 439/144

(56) References Cited

U.S. PATENT DOCUMENTS

| | | | |
|---|---|---|---|
| 4,640,575 | * | 2/1987 | Dumas ................................ 385/134 |
| 5,030,120 | * | 7/1991 | Hartley ............................... 439/144 |
| 5,202,949 | * | 4/1993 | Hileman et al. .................... 385/134 |
| 5,506,922 | * | 4/1996 | Grois et al. .......................... 385/75 |
| 5,838,855 | * | 11/1998 | Stephenson ......................... 385/53 |
| 5,887,098 | * | 3/1999 | Ernst et al. .......................... 385/55 |

* cited by examiner

Primary Examiner—John D. Lee
(74) Attorney, Agent, or Firm—Cantor Colburn LLP

(57) ABSTRACT

Dust caps for use with multiple optical fiber adapters and connectors. A first embodiment of the invention is a dust cap for use with ST adapters, ST connectors and SC connectors. The dust cap includes a sealing surface for contacting the bottom of an ST adapter for sealing the portion of the adapter containing the alignment sleeve. The dust cap also includes an opening having a reduced diameter to prevent contamination of the tip of the ferrule of an ST or SC connector. The dust cap may be formed in a duplex fashion and include a retaining strap for securing the dust cap to an ST adapter. An alternative embodiment of the invention is a dust cap having a first side for mating with either an SC or ST adapter and a second side for mating with either an SC or ST connector.

25 Claims, 13 Drawing Sheets

DUST CAPS FOR USE WITH TELECOMMUNICATIONS ADAPTERS AND CONNECTORS

BACKGROUND OF THE INVENTION

1. Field of the Invention

The invention relates generally to dust caps and in particular to dust caps for use with multiple types of telecommunications adapters and connectors.

2. Prior Art

Dust caps are used to prevent optical fiber adapters and connectors from being contaminated by dust, dirt, etc. Most existing adapter manufacturers utilize an industry-standard, soft-polymer dust cap for ST adapters and a flat-surfaced, rectangular dust cap for SC adapters. These styles are difficult to install and equally difficult to remove. FIG. 1A is a cross sectional view of a conventional dust cap 12 mounted to an ST adapter 10. Conventional ST dust caps have several drawbacks. First, the dust cap 12 is generally cylindrical and does not provide any surface for gripping the dust cap during removal. In addition, the ST adapter includes keying posts 14 which prevent the dust cap 12 from making a good seal against the adapter body. Accordingly, dust can ingress into the inside of the ST adapter and deteriorate performance of the optical fiber coupled at the adapter 10.

Conventional SC dust caps are effective dust caps, but are typically difficult to install and to remove. FIG. 1B is a perspective view of a conventional SC dust cap mounted to an SC adapter 13. Both simplex and duplex SC dust caps include a segment 15 which inserts into the SC adapter cavity and a rectangular head 11 (whose thickness is approximately ⅛ inch) which seats against the facial end of the adapter 13. To remove the cap, once installed, one must attempt to grip this rectangular head 11. Since the width and length of head 11 is the same as (or very close to) the width and length of the adapter itself, and because the head 11 thickness is relatively thin (⅛"), it is difficult to grip this head 11 in order to pull it out of the SC adapter 13. The width and length of the head 11 cannot be increased (which could provide an improved gripping surface) due to the constraints arising from the need to be able to install the adapter 13 through the standard rectangular panel cut-out with dust caps in place. Hence, if the head 11 was any larger, it wouldn't fit through the cut-out.

SUMMARY OF THE INVENTION

The above-discussed and other drawbacks and deficiencies of the prior art are overcome or alleviated by the dust caps of the present invention. A first embodiment of the invention is a dust cap for use with ST adapters, ST connectors and SC connectors. The dust cap includes a sealing surface for contacting the bottom of an ST adapter for sealing the portion of the adapter containing the alignment sleeve. The dust cap also includes an opening having a reduced diameter to prevent contamination of the tip of the ferrule of an ST or SC connector. The dust cap may be formed in a duplex fashion and include a retaining strap for securing the dust cap to an ST adapter. An alternative embodiment of the invention is a dust cap having a first side for mating with either an SC or ST adapter and a second side for mating with either an SC or ST connector.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 2:
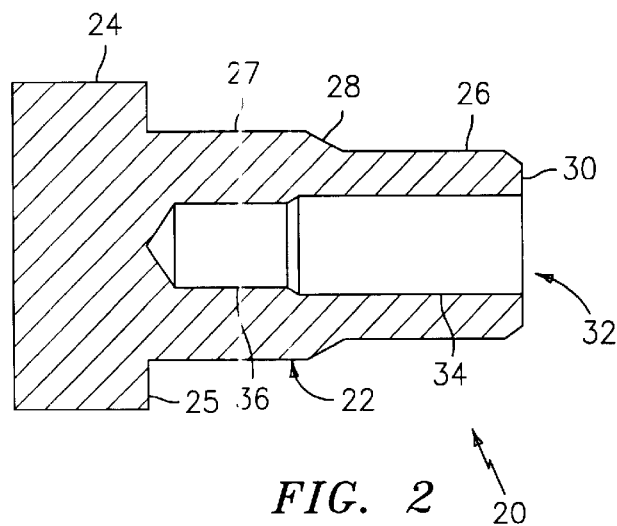
FIG. 2 is a cross-sectional view of a dust cap in accordance with the present invention.

FIG. 2 is a cross-sectional view of a dust cap, shown generally at 20, having a body 22. A first end of body 22 is integrally joined to a dust cap head 24. Dust cap head 24 is generally cylindrical and has a diameter greater than body 22. It is understood that dust cap head 24 may have other geometries as long as an outer dimension is greater than the diameter of body 22. This provides a shoulder 25 for grasping dust cap 20 and facilitates installation and removal of the dust cap. The body 22 includes a first cylindrical section 27 and a second cylindrical section 26. The second cylindrical section 26 has a diameter less than the first cylindrical section and provides a lead in upon installing the dust cap 20. A tapered section 28 provides the transition between first cylindrical section 27 and second cylindrical section 26. The second end of body 22 has a sealing face 30 for contacting a surface in the ST adapter as shown in FIG. 3.

Figure 1A:
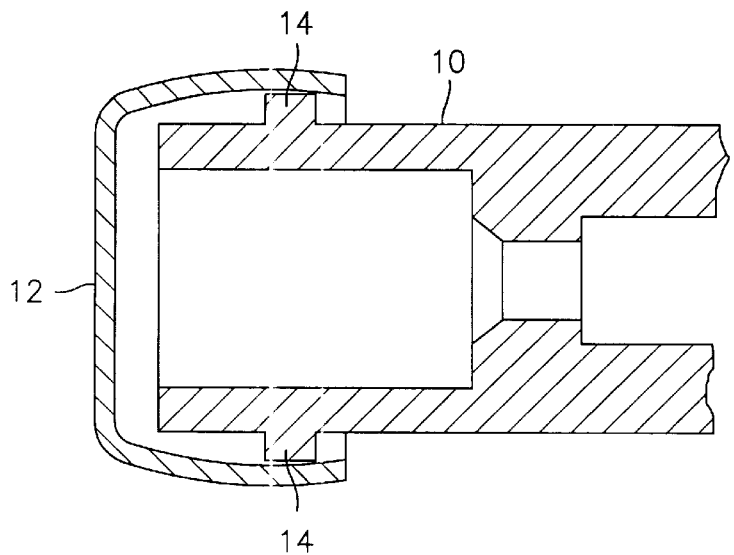
FIG. 1A is a cross-sectional view of a conventional dust cap mounted to an ST adapter.
Figure 1B:
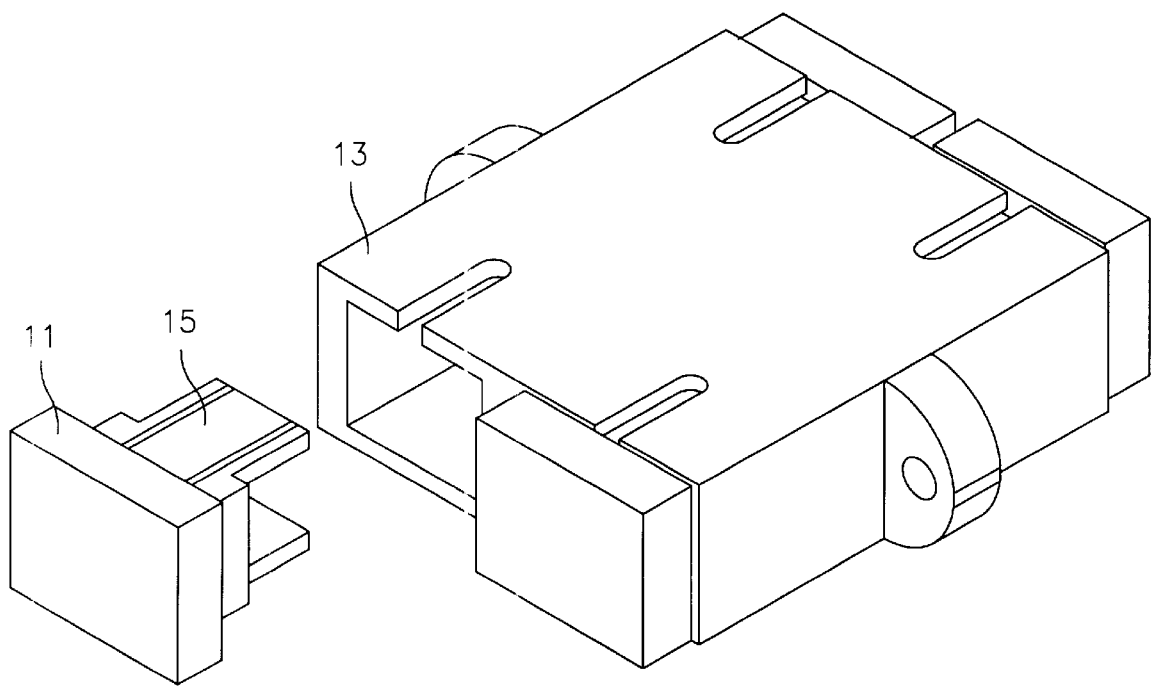
FIG. 1B is a perspective view of a conventional SC dust cap and adapter.
Figure 3:
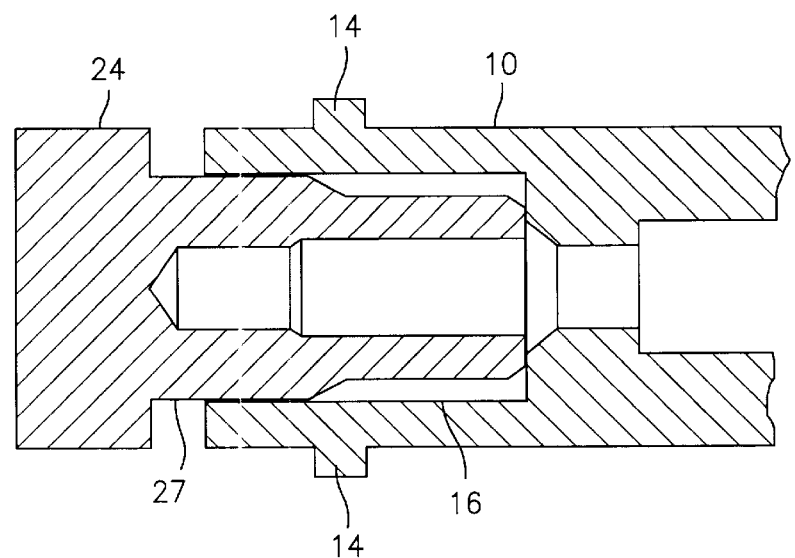
FIG. 3 is a cross-sectional view of the dust cap of FIG. 2 mounted to an ST adapter.

As shown in FIG. 3, the dust cap 20 fits within the cylindrical counterbore of an ST adapter (with a slight interference with first cylindrical section 27) as opposed to the conventional design (shown in FIG. 1) that fits onto the outside diameter of the ST adapter 10 and must be forced over the keying studs 14. The body 22 has a length greater than the depth of the cylindrical counterbore of the ST adapter 10 so that sealing face 30 contacts the bottom of the counterbore and seals off the entry into the section of adapter 10 which contains an alignment sleeve.

Figure 4:
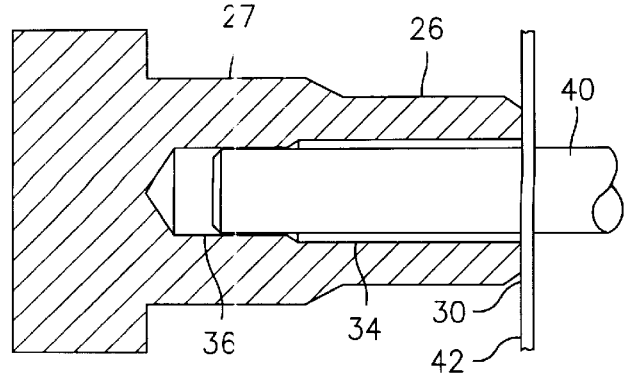
FIG. 4 is a cross-sectional view of the dust cap of FIG. 2 mounted to a connector.

Typically, dust caps are designed for individual interconnection usage; i.e., an ST adapter utilizes a dust cap that could not be used for any other fiber optic interconnect such as an ST plug. Dust cap 20 can be used to effectively prevent dust from entering into an ST adapter alignment sleeve as shown in FIG. 3, and also provide dust protection with an ST connector or an SC connector. This is accomplished by incorporating a stepped opening 32 in the dust cap 20 which fits onto the outside diameter of the connector ferrule 40 (the optically sensitive portion of the connector) with a slight interference fit as shown in FIG. 4. Only a portion of the connector is shown in FIG. 4 and represents either an ST or an SC connector. The opening 32 is stepped such that the diameter of the second opening portion 36 is slightly less than the outside diameter of the ferrule 40 and, hence, provides a slight interference fit and therefore retains the dust cap 20 onto the ferrule 40. The diameter of the first opening portion 34 is larger in diameter than the outer diameter of ferrule 40 and serves as a lead-in onto the ferrule 40 and also reduces the length of the interference section which, in turn, reduces the force required to insert and/or remove dust cap 20.

The outside diameter of body 22 is also stepped so as to enable use on both an ST connector and an SC connector as well as the ST adapter. The SC connector design includes a counterbore section which surrounds a portion of the ferrule that would interfere with the cap being inserted fully due to the relatively large size of first body section 27 that is designed to provide interference within the ST adapter counterbore (which is considerably larger than the SC connector counterbore diameter and, hence, would not fit into it). Therefore, to enable use as an SC connector dust cap, the outer diameter of the second body section 26 is dimensioned to be small enough to clear the SC connector counterbore for its entire depth which allows sealing surface 30 to butt against the bottom 42 of the SC or ST connector counterbore.

The depth of the opening 32 in the dust cap 20 is deeper than the length of either the ST or SC connector ferrule 40 and the outside dimension of the cap 20 enables sealing surface 30 to contact the bottom 42 of the ST or SC counterbore. Therefore, the cap 20 can be easily inserted all the way onto either the ST or SC ferrule until it bottoms against surface 42 and the cap 20 will not make contact with optically sensitive tip of the ferrule 40.

Figure 5:
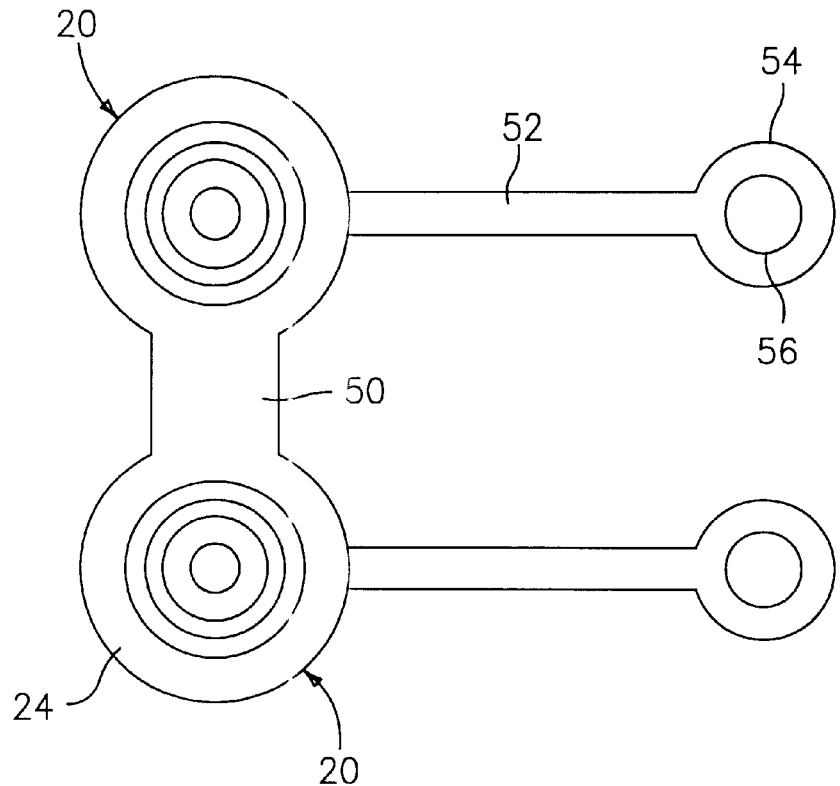
FIG. 5 is a top view of a duplex dust cap in an alternative embodiment of the invention.
Figure 6:
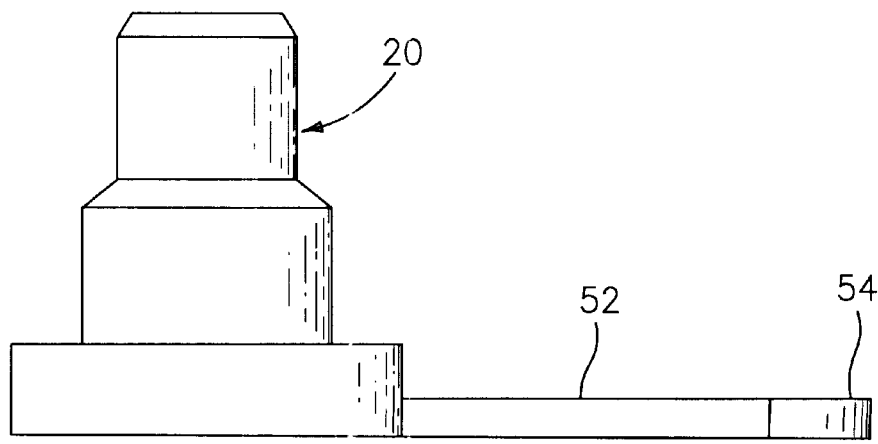
FIG. 6 is a side view of the duplex dust cap of FIG. 5.

FIG. 5 is a top view of a duplex dust cap in accordance with an alternative embodiment of the invention. The duplex dust cap is made up of two dust caps 20, described above with reference to FIGS. 2–4. Dust caps 20 are joined by a web 50 integrally connected to each dust cap head 24. The mold for the duplex dust cap may include a shut off insert to prevent formation of web 50 and produce two separate dust caps if desired.

Figure 7:
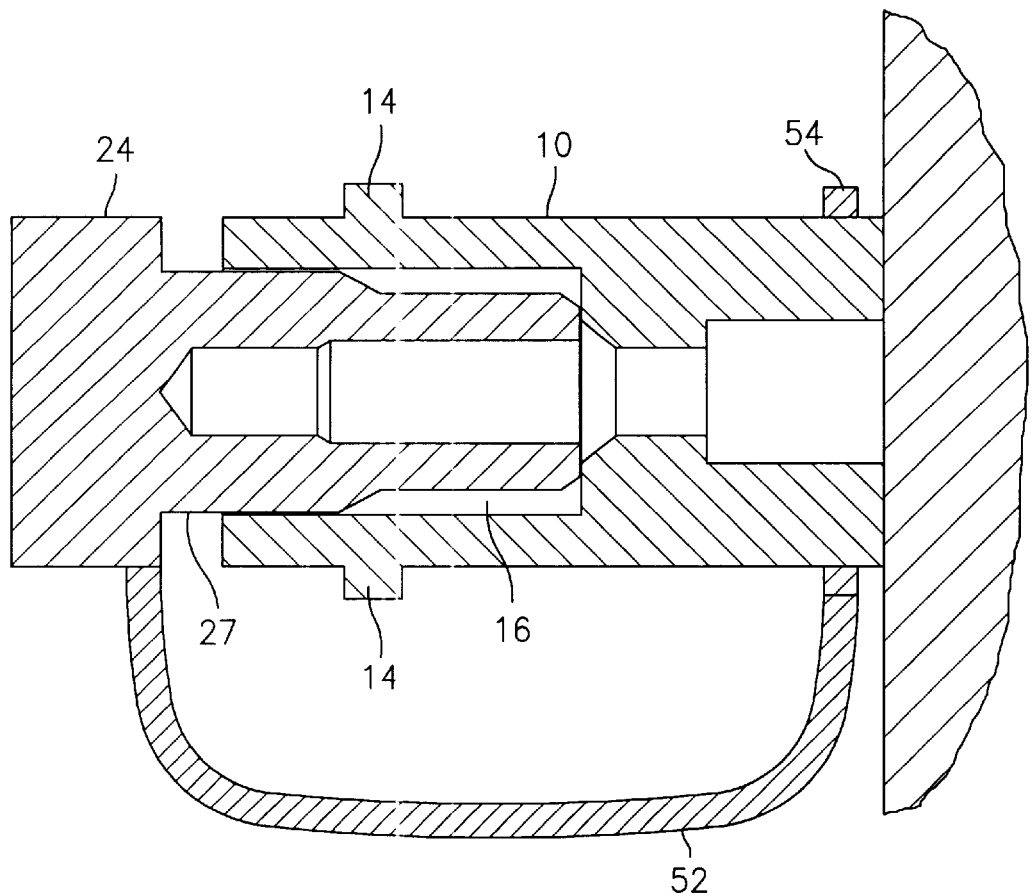
FIG. 7 is a cross-sectional view of the duplex dust cap of FIG. 5 mounted to an ST adapter.

Also shown in FIG. 5 are retaining straps 52 having a first end connected to dust cap head 24 and having a retaining strap head 54 at the second end. The retaining strap 54 can be used with either a single dust cap 20 or a duplex dust cap as shown as in FIG. 5. As shown in FIG. 7, the retaining strap head 54 has an opening 56 that fits over the ST adapter body 10 to retain dust cap 20 to adapter 10.

The opening 56 is dimensioned to fit over the ST adapter 10 outside diameter and is retained by the fact that the opening 56 has an inside diameter smaller than the distance across the two studs 14. The resilient nature of the retaining strap allows the retaining strap head 54 to be stretched over and past the studs 14. The dust cap 20 cannot be inadvertently removed from adapter 10. The thickness of the retaining strap head 54 is sufficiently thin so as to not interfere with mating an ST connector to ST adapter 10.

Figure 8:
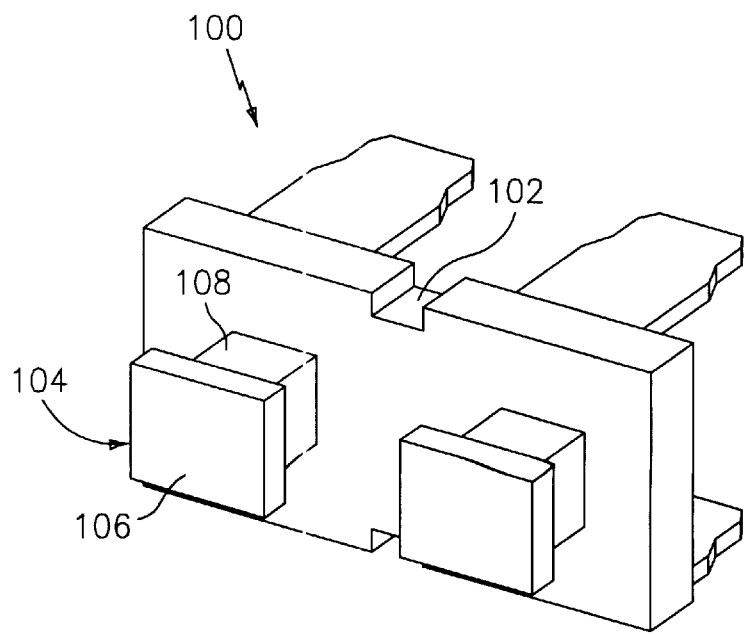
FIG. 8 is a perspective view of a duplex dust cap in an alternative embodiment of the invention.

FIG. 8 is a perspective view of a duplex dust cap 100 in an alternative embodiment of the invention. The duplex dust cap 100 is for use with duplex SC adapters. The duplex dust cap 100 includes web 102 for integrally joining two single SC dust caps. Each SC dust cap also includes a pull 104 made up of a post 108 and head 106. The head 106 has an outer dimension greater than the outer dimension of post 104 and facilitates installation and removal of the dust cap 100. The mold for dust cap 100 may include a shut off insert for eliminating web 102 forming two, separate dust caps, each having pull 104. The neck 108 and head 106 may have a variety of geometries (circular, square, etc.) without departing from the scope of the invention.

Figure 9:
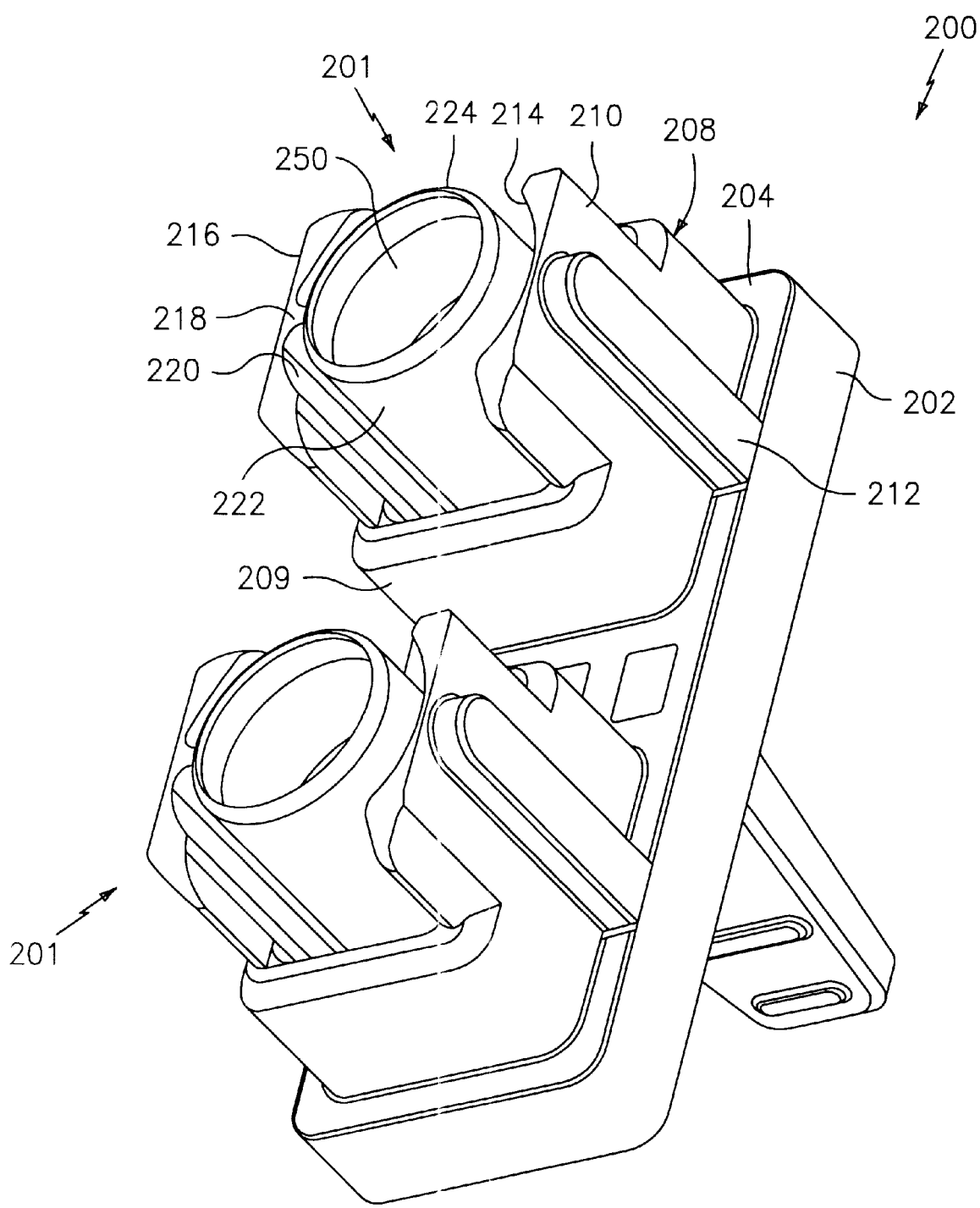
FIG. 9 is a perspective view of a first side of an alternative dust cap.
Figure 11:
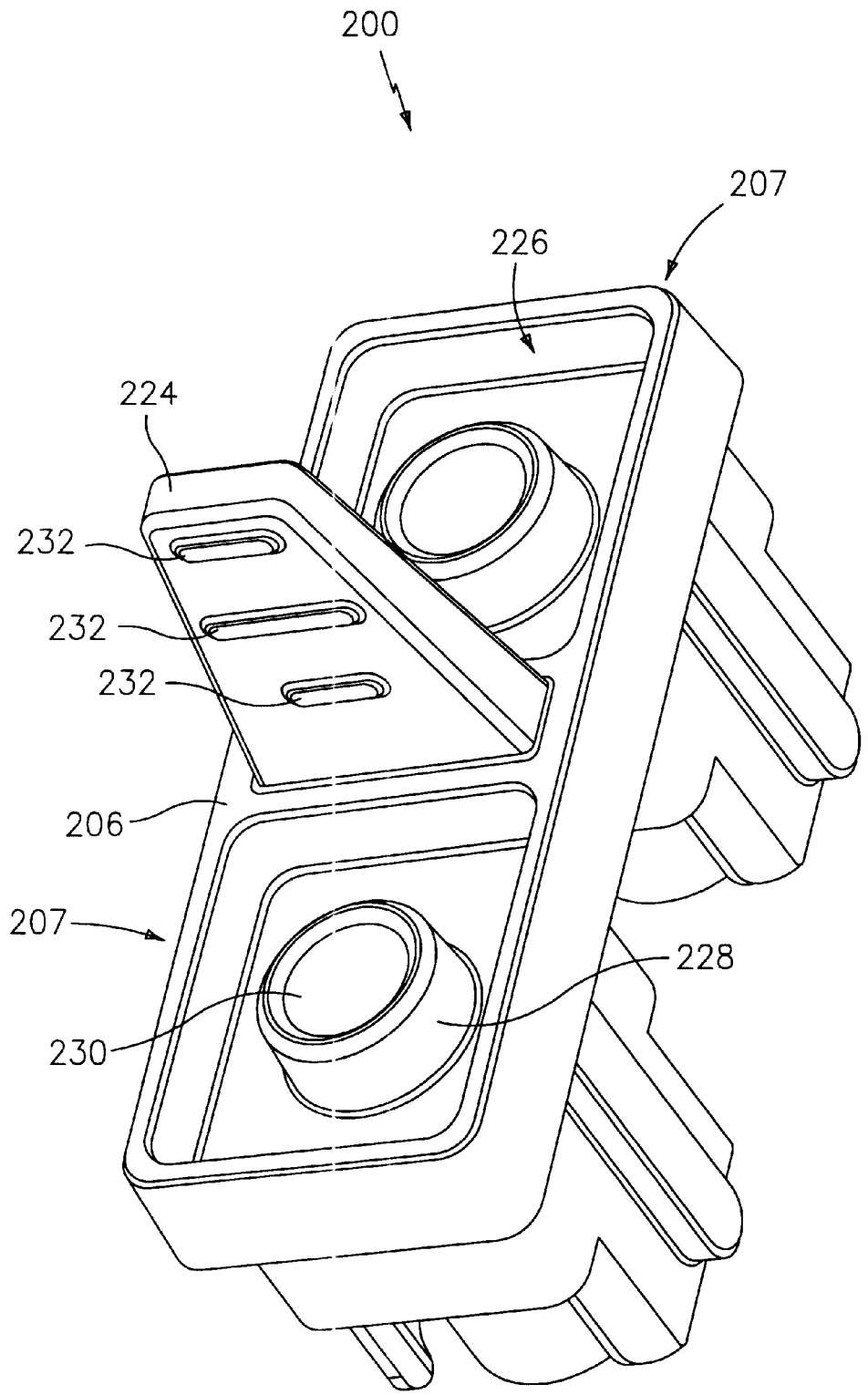
FIG. 11 is a perspective view of a second side of the alternative dust cap.
Figure 12:
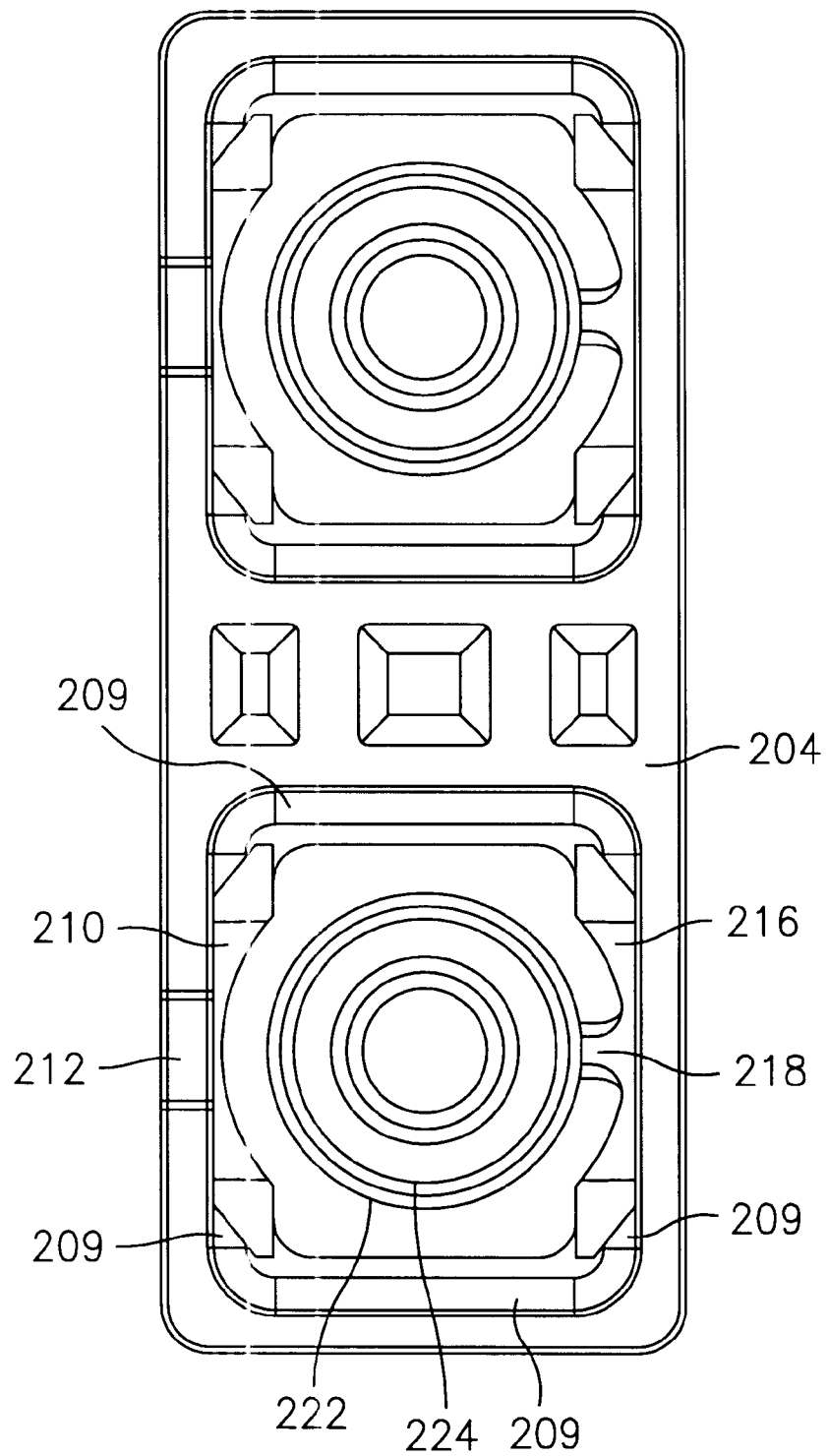
FIG. 12 is a top view of the first side of the alternative dust cap.

FIG. 9 is a perspective view of an alternative dust cap shown generally at 200. Dust cap 200 is compatible with ST adapters, ST connectors, SC adapters and SC connectors. The dust cap 200 includes a base 202 having a first side 204 and a second side 206, as shown in FIG. 11. The first side 204 includes two adapter caps 201, each having a skirt 208 being generally square and sized to fit snugly within the opening of an SC adapter. Skirt 208 is made up of 4 walls 209. The entire dust cap 200 is made from a resilient material such as a soft polymer or rubber. Skirt 208 includes a first extension 210 integral with and extending parallel to one of the walls 209 making up skirt 208. The outside surface of first extension 210 includes a first key 212 which engages a keying slot in an SC adapter. The interior surface of the first extension 210 includes an arcuate surface 214 which corresponds to the arcuate surface on an ST adapter.

Skirt 208 includes a second extension 216 integral with and extending parallel to one of the walls 209 making up skirt 208. The inside surface of second extension 216 includes arcuate surface 220 which corresponds to the arcuate surface of an ST adapter. The inside surface of second extension 216 includes a second key 218 for engaging a keying slot in an ST adapter.

First side 204 also includes a sealing member 222 extending from base 202 past first extension 210 and second extension 216. Sealing member 222 fits within the interior of an ST adapter and sealing surface 224 contacts the bottom of the ST adapter to seal the portion of the ST adapter where the alignment sleeve is positioned. Sealing member 222 also includes opening 250 for receiving a sleeve retainer in an SC adapter as described in co-pending U.S. patent application Ser. No. 08/775,998 entitled Adapters for Coupling Optical Fiber, the contents of which are incorporated by reference.

Figure 10:
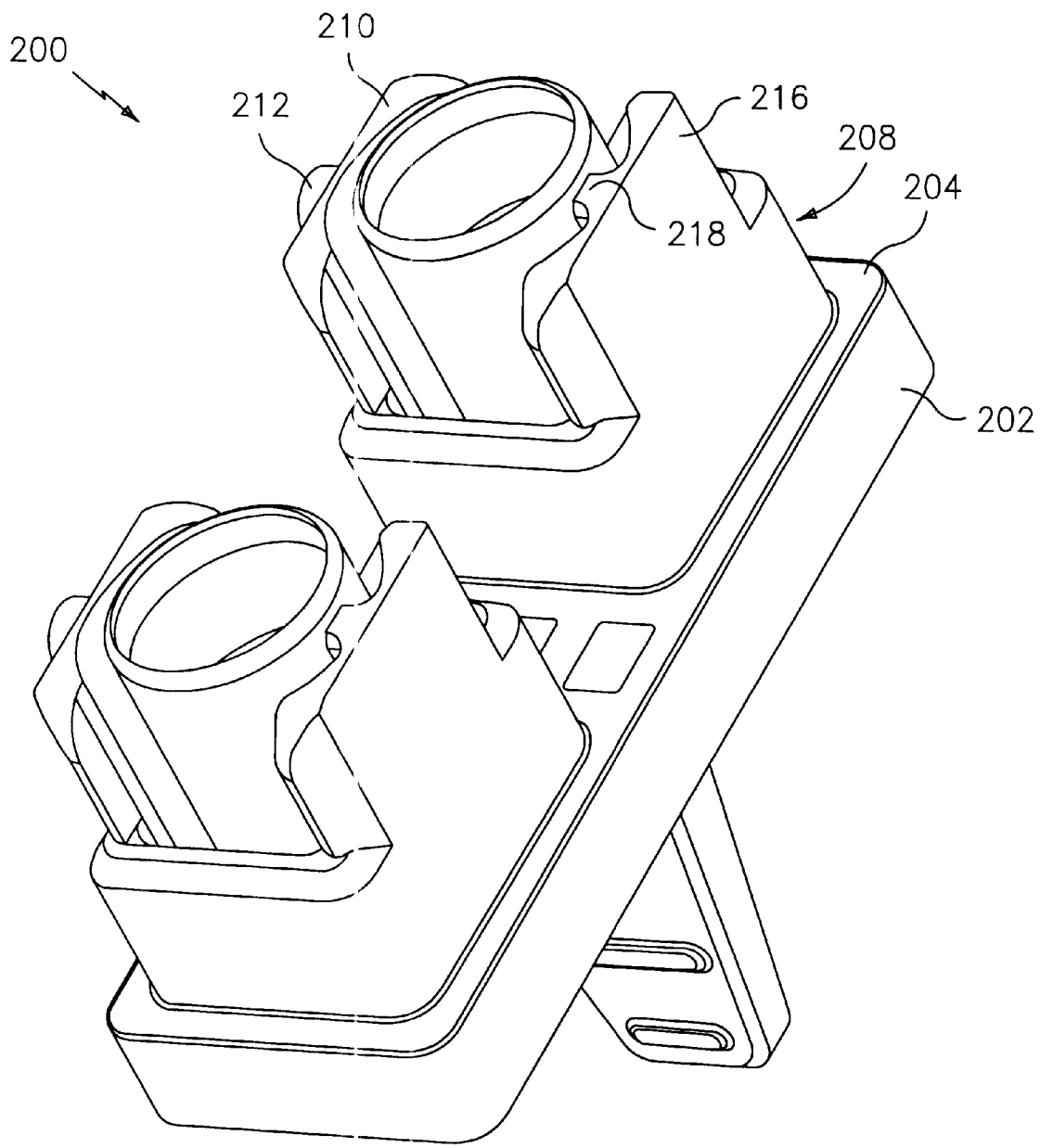
FIG. 10 is another perspective view of the first side of the alternative dust cap.

The base 202 shown in FIG. 9 is sized to have two adapter caps 201 to provide a duplex dust cap. It is understood that the dust cap can be made in a simplex configuration, but the preferred embodiment is duplex. FIG. 10 is another perspective view of the first side 204 of the dust cap 200.

FIG. 11 is a perspective view of second surface 206 of dust cap 200. The second surface 206 includes two connector caps 207 for receiving either an ST connector or an SC connector. Each connector cap 207 includes a recess 226 sized to receive the outside of an SC connector with a slight interference. Positioned in recess 226 is a generally cylindrical protrusion 228 having an opening 230 formed therein. The detail of opening 230 is described below with reference to FIG. 16. Opening 230 receives the ferrule of either an ST connector or an SC connector and protrusion 226 encircles the ferrule and provides additional support to the ferrule. A generally trapezoidal handle 224 extends from second side 206 and includes ribs 232 for facilitating gripping of the handle 224. FIGS. 12–15 are assorted views of dust cap 200 and are self explanatory.

Figure 13:
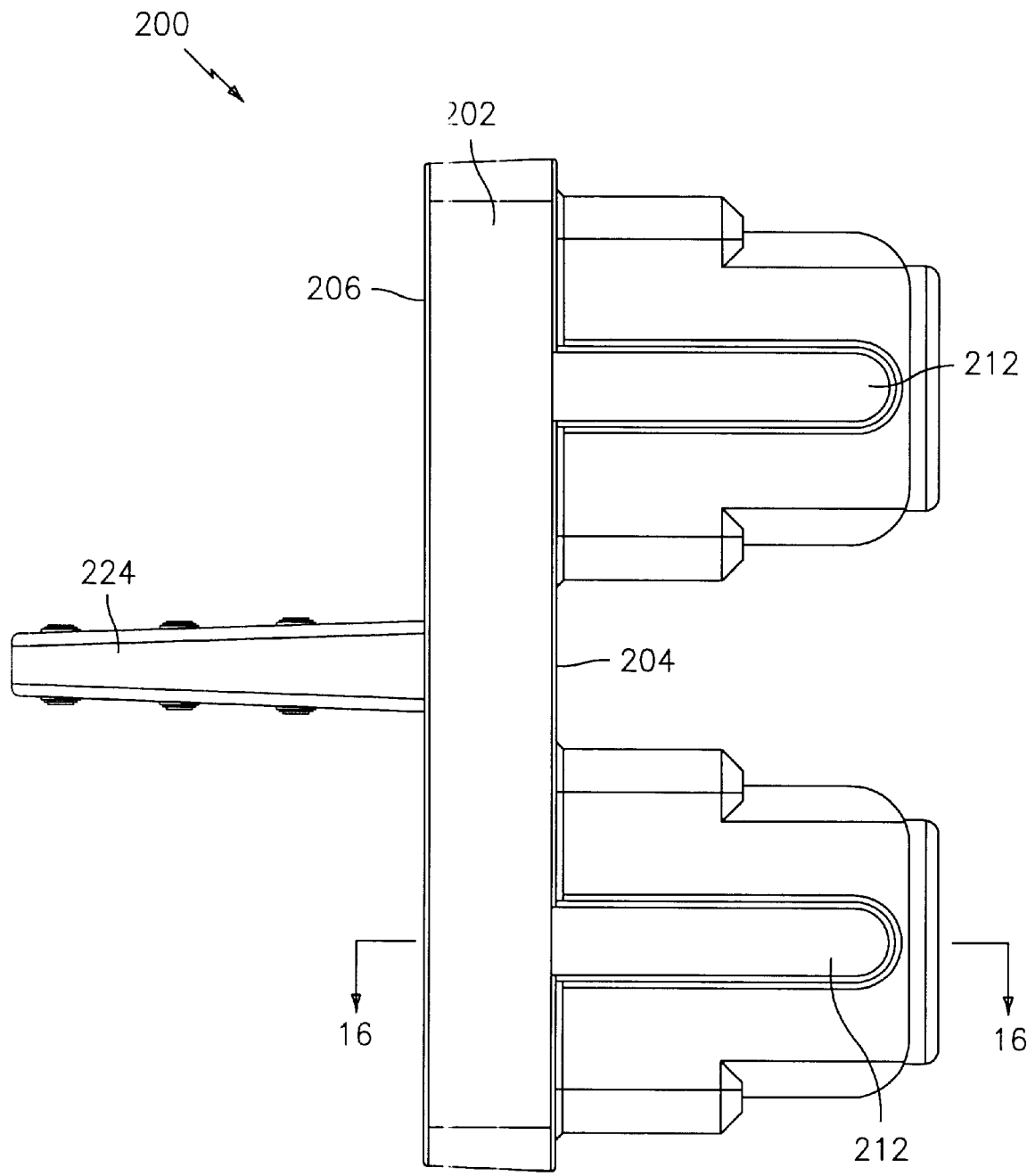
FIG. 13 is a side view of the alternative dust cap.
Figure 14:
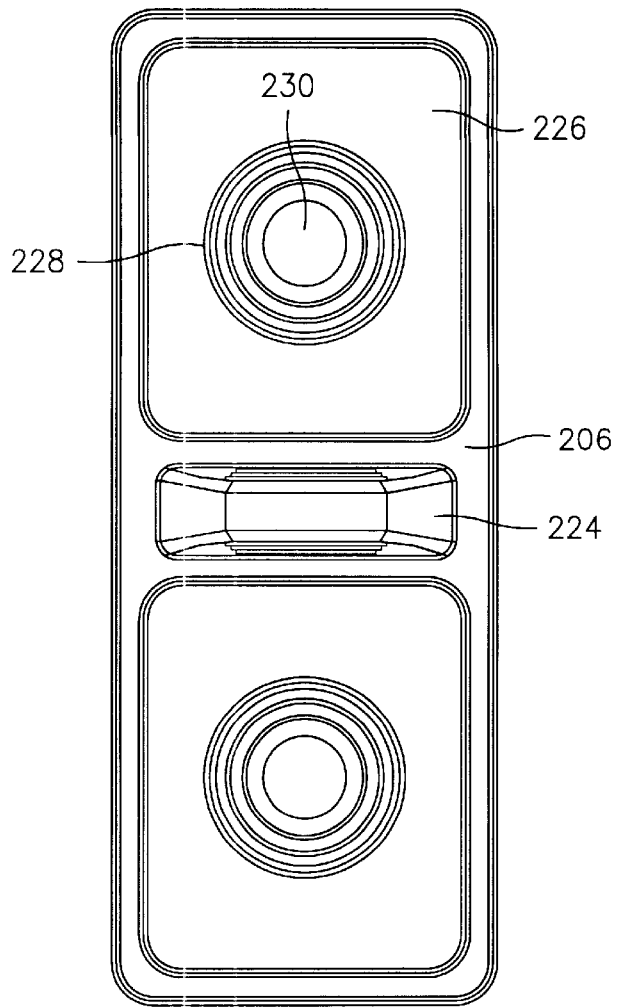
FIG. 14 is a top view of the second side of the alternative dust cap.
Figure 15:
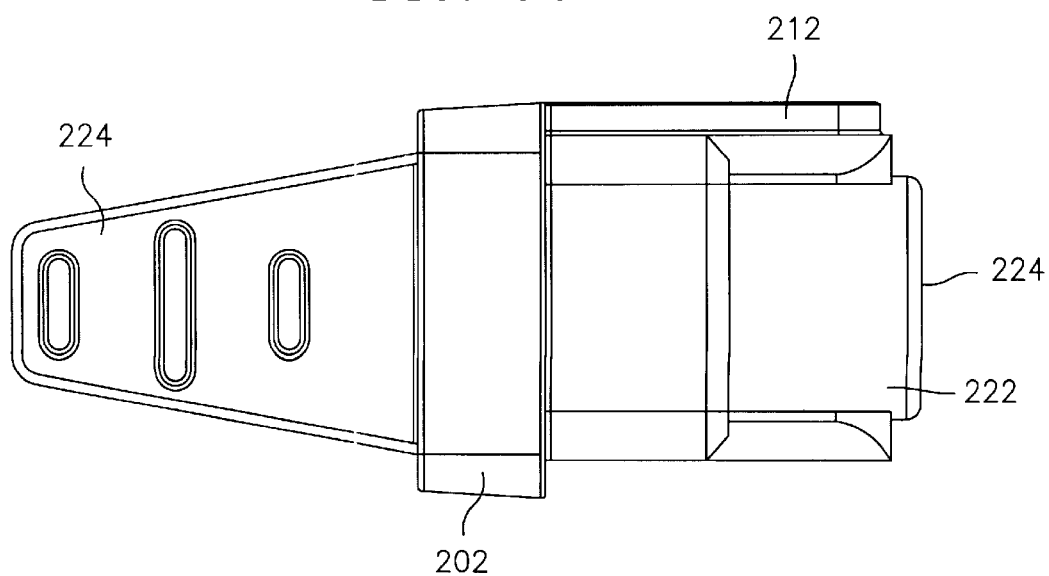
FIG. 15 is a side view of the alternative dust cap.
Figure 16:
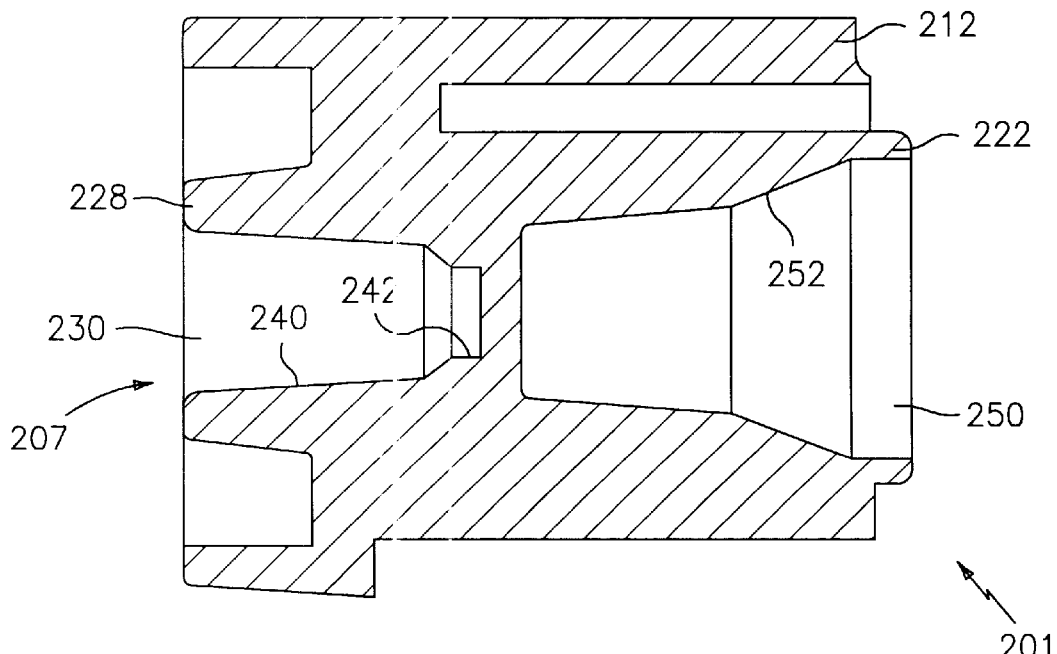
FIG. 16 is a cross-sectional view taken along line 16—16 of FIG. 13.

FIG. 16 is a cross sectional view taken along line 16—16 of FIG. 13. As shown in FIG. 16, the connector cap 207 includes opening 230 for receiving a ferrule extending from either an ST or SC connector. Opening 230 has a first section 240 having a first diameter and a second section 242 having a second diameter smaller than the first diameter. The larger diameter of the first section serves as a lead-in upon insertion of the ferrule and the second section contacts the outside of the ferrule for a snug fit. Protrusion 228 encircling opening 230 provides additional support to the ferrule. The depth of opening 230 is such that the tip of the ferrule does not contact the bottom of opening 230 thus preventing contamination of the ferrule. Also shown in FIG. 16 is opening 250 having a tapered section 252 of reducing diameter. The tapered section 252 serves as a lead-in for the sleeve retainer in an SC adapter and provides a tight fit between the adapter cap 201 and the sleeve retainer.

Figure 17:
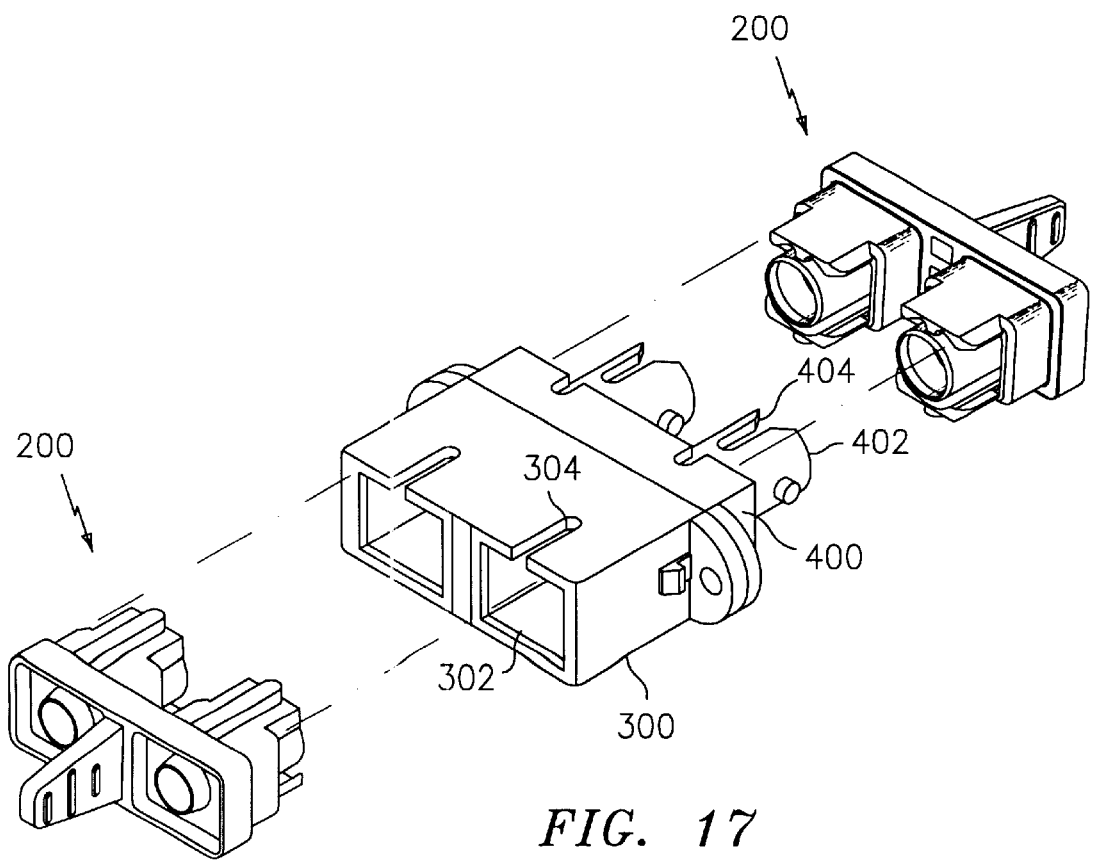
FIG. 17 is an exploded perspective view of two alternative dust caps and an adapter.
Figure 18:
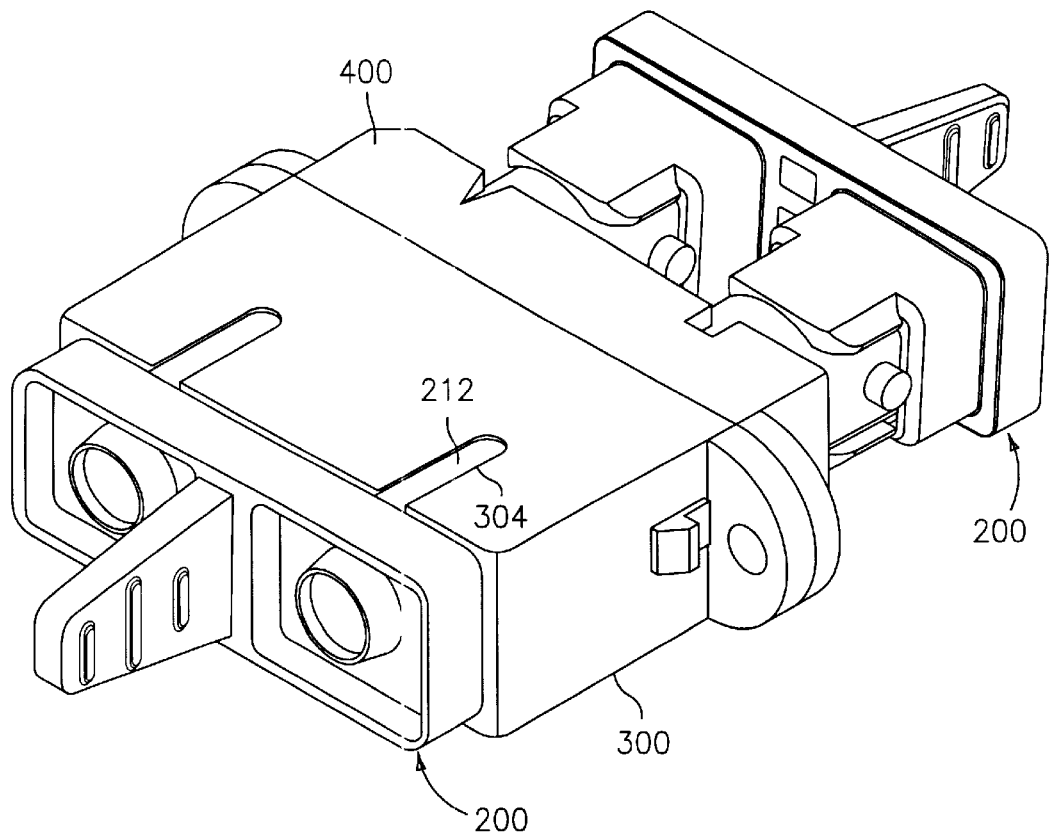
FIG. 18 is a perspective view of two alternative dust caps mounted to an adapter.

The mounting of the dust cap 200 to adapters and connectors will now be described. FIG. 17 is an exploded view of two dust caps 200 and an adapter having an SC adapter body 300 and an ST adapter body 400. SC adapter body 300 includes an opening 302 and a keying slot 304. ST adapter body 400 includes an opening 402 and a keying slot 404. FIG. 18 is a perspective view of the dust caps 200 mounted to the adapter shown in FIG. 17. First key 212 is positioned in keying slot 304 of adapter body 300. In addition, skirt 208 contacts the edge of opening 302. Sealing the keying slot 304 along with the opening 302 prevents dust from entering the SC adapter body. With respect to ST adapter body 400, second key 218 is positioned in keying slot 404 and sealing member 222 extends into opening 402. As described above, sealing surface 224 contacts the bottom of the SC adapter counterbore to seal against the bottom of the SC adapter. The inside surfaces of extensions 210 and 216 contact the outside surface of the SC adapter. Sealing both keying slot 402 and the opening 404 of the ST adapter prevents dust from entering the ST adapter.

Figure 19:
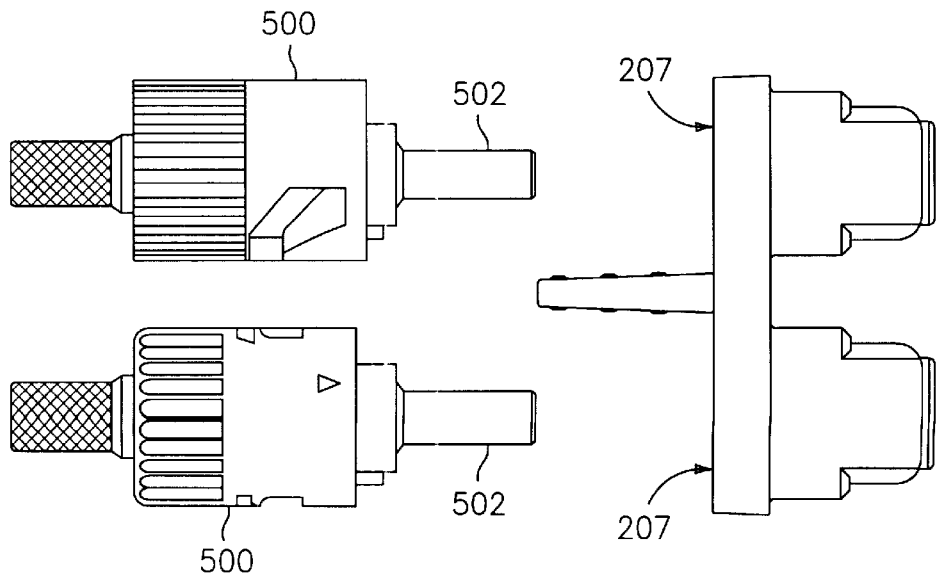
FIG. 19 is a side view of the alternative dust cap aligned with ST connectors.

FIG. 19 is a side view of two ST connectors 500 aligned with the connector caps 207 of dust cap 200. Each ST connector 500 has a ferrule 502 which is positioned in opening 230. As described above with reference to FIG. 16, opening 230 includes a reduced diameter section 242 that contacts the outside of the ferrule 502 and prevents the tip of the ferrule 502 from contacting the bottom of opening 230. This protects the tip of the ferrule 502 and prevents contamination.

Figure 20:
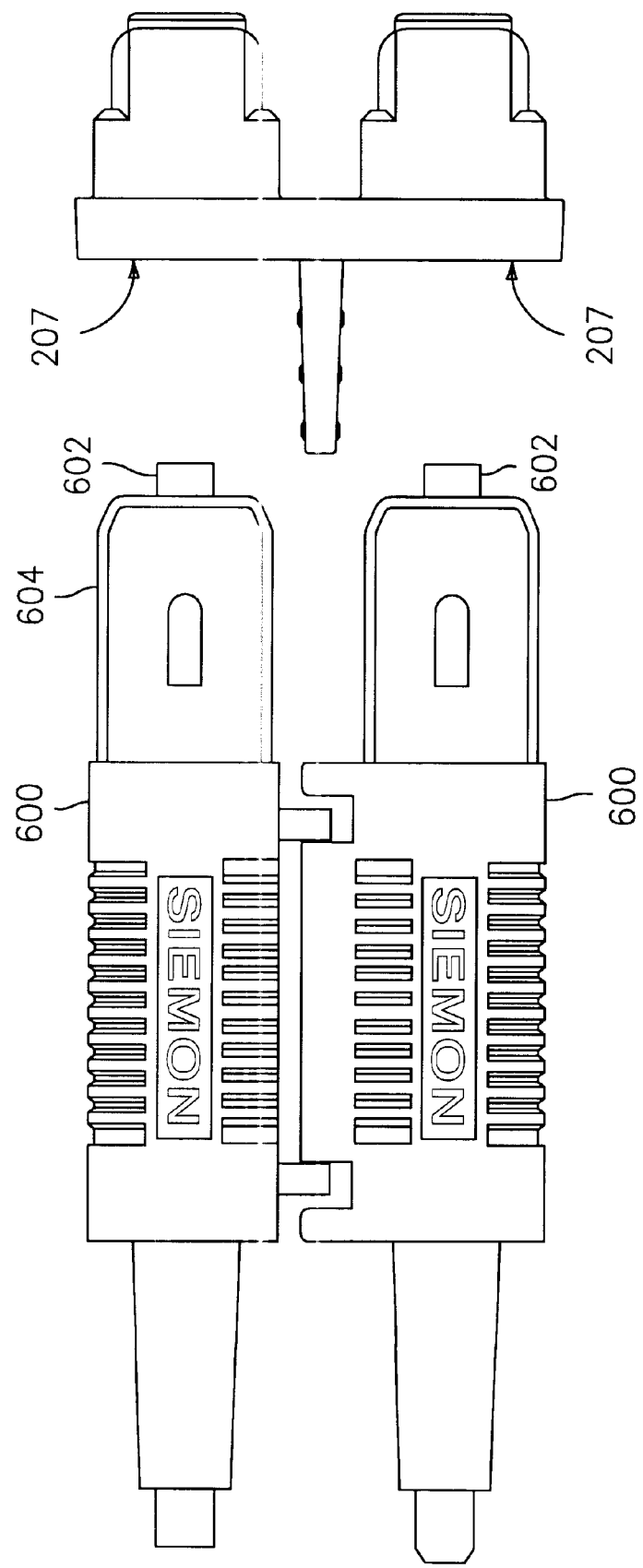
FIG. 20 is a side view of the alternative dust cap aligned with SC connectors.

FIG. 20 is a side view of two SC connectors 600 aligned with the connector caps 207 of dust cap 200. Each SC connector 600 has a ferrule 602 for placement in opening 230. As noted above, the ferrule 602 is positioned in opening 230 to protect the tip of the ferrule 602 from contamination. In addition, the recess 206 in connector cap 207 receives the body 604 of SC connector 600 with slight interference to additionally prevent contamination of the ferrule.

While preferred embodiments have been shown and described, various modifications and substitutions may be made thereto without departing from the spirit and scope of the invention. Accordingly, it is to be understood that the present invention has been described by way of illustration and not limitation.

We claim:

1. A dust cap for use with optical fiber adapters and optical fiber connectors comprising:
   a base having a first side and a second side;
   an adapter cap positioned on said first side for receiving one of an ST adapter and an SC adapter; and
   a connector cap positioned on said second side for receiving one of an ST connector and an SC connector.

2. The dust cap of claim 1 further comprising a handle connected to said base.

3. The dust cap of claim 1 wherein said connector cap includes a recess for receiving and contacting the outside of an SC connector.

4. The dust cap of claim 1 wherein said connector cap includes an opening for receiving a ferrule from an SC connector or an ST connector.

5. The dust cap of claim 4 wherein said opening includes a first section having a first diameter and a second section having a second diameter less than said first diameter, said second diameter sized so as to contact the ferrule.

6. The dust cap of claim 4 wherein said connector cap further comprises a cylindrical protrusion positioned around said opening.

7. The dust cap of claim 1 wherein said adapter cap includes a skirt for contacting an opening of an SC adapter.

8. The dust cap of claim 7 further comprising a first extension integral with said skirt.

9. The dust cap of claim 8 further comprising a first key positioned on said first extension for engaging a keying slot in an SC adapter.

10. The dust cap of claim 8 wherein said first extension includes an interior surface, a portion of said interior surface being curved to match a surface of an ST adapter.

11. The dust cap of claim 8 further comprising a second extension integral with said skirt.

12. The dust cap of claim 11 further comprising a second key positioned on said second extension for engaging a keying slot in an ST adapter.

13. The dust cap of claim 11 wherein said second extension includes an interior surface, a portion of said interior surface being curved to match a surface of an ST adapter.

14. The dust cap of claim 7 further comprising:
   an extension integral with said skirt; and
   a key positioned on said extension for engaging a keying slot in an ST adapter.

15. The dust cap of claim 1 wherein said adapter cap includes a sealing member having a sealing surface for contacting a surface of an ST adapter.

16. A dust cap for use with optical fiber adapters and optical fiber connectors comprising:
   a base having a first side and a second side;
   an adapter cap positioned on said first side for receiving one of an ST adapter and an SC adapter, said adapter cap including a skirt for contacting an opening of an SC adapter and a first key for engaging a keying slot in an SC adapter and a second key for engaging a keying slot in an ST adapter; and
   a connector cap positioned on said second side for receiving one of an ST connector and an SC connector, said connector cap including a recess for receiving and contacting the outside of an SC connector and an opening for receiving a ferrule from one of an SC connector and an ST connector.

17. A dust cap for use with optical fiber adapters comprising:
a base having a first side and a second side;
an adapter cap positioned on said first side of receiving both an ST adapter and an SC adapter.

18. The dust cap of claim 17 wherein said adapter cap includes a skirt for containing an opening of an SC adapter.

19. The dust cap of claim 18 further comprising a first extension integral with said skirt.

20. The dust cap of claim 19 further comprising a first key positioned on said first extension for engaging a keying slot in an SC adapter.

21. The dust cap of claim 19 wherein said first extension includes an interior surface, a portion of said interior surface being curved to match a surface of an ST adapter.

22. The dust cap of claim 19 further comprising a second extension integral with said skirt.

23. The dust cap of claim 22 further comprising a second key positioned on said second extension for engaging a keying slot in an ST adapter.

24. The dust cap of claim 22 wherein said second extension includes an interior surface, a portion of said interior surface being curved to match a surface of an ST adapter.

25. The dust cap of claim 17 wherein said adapter cap includes a sealing member having a sealing surface for contacting a surface of an ST adapter.

* * * * *